US005150696A

United States Patent [19]

Kabasin et al.

[11] Patent Number: 5,150,696

[45] Date of Patent: Sep. 29, 1992

[54] ADAPTIVE MEMORY CONTROL FOR NORMALIZED DILUTION

[75] Inventors: Daniel F. Kabasin, Rochester; Donald D. Stoltman, Henrietta, both of N.Y.

[73] Assignee: General Motors Corporation, Detroit, Mich.

[21] Appl. No.: 796,185

[22] Filed: Nov. 22, 1991

[51] Int. Cl.[5] .............................................. F02M 25/07

[52] U.S. Cl. ................................... 123/571; 123/698; 364/431.06

[58] Field of Search ....................... 123/489, 571, 569; 364/431.06

[56] References Cited

U.S. PATENT DOCUMENTS

| | | | |
|---|---|---|---|
| 4,265,208 | 5/1981 | Emmert et al. | 123/440 |
| 4,399,791 | 8/1983 | Kobayashi et al. | 123/571 X |
| 4,428,354 | 1/1984 | Sundeen et al. | 123/568 |
| 4,448,178 | 5/1984 | Yamato et al. | 123/571 |
| 4,454,855 | 6/1984 | Otobe et al. | 123/571 |
| 4,483,308 | 11/1984 | Hasegawa | 123/571 |
| 4,782,810 | 11/1988 | Shimoda et al. | 123/571 |
| 4,848,303 | 7/1989 | Fujimoto et al. | 123/571 |
| 4,938,198 | 7/1990 | Suzuki | 123/571 |
| 5,002,031 | 3/1991 | Kako | 123/571 |

*Primary Examiner*—Willis R. Wolfe
*Attorney, Agent, or Firm*—Howard N. Conkey

[57] ABSTRACT

An internal combustion engine air-fuel ratio control method and apparatus wherein a most favorable parameter selected from the group consisting of air, fuel, and recirculated exhaust gas is adjusted in response to detected deviation of the air-fuel ratio away from the desired ratio. Supplemental control is provided by means of the remaining parameters in the event that the most favorable parameter runs out of authority.

8 Claims, 7 Drawing Sheets

ADAPTIVE MEMORY CONTROL FOR NORMALIZED DILUTION

FIELD OF THE INVENTION

This invention relates to improvements in air-fuel ratio control in internal combustion engines.

BACKGROUND OF THE INVENTION

In conventional automotive engine control, the extent that certain well-known engine and emission system performance goals can be achieved is largely determined by the capacity to control the engine air-fuel ratio. In general, many conventional vehicle powertrain controllers PCMs attempt to maintain the engine air-fuel ratio at the well known stoichiometric ratio ($\lambda=1$). This ratio is generally found to yield satisfactory engine performance.

Engine control systems that are capable of controlling fuel, air, and recirculated exhaust gas EGR, attempt to maintain the air-fuel ratio at stoichiometry by coordinating control of the quantity of fuel, air, and EGR admitted into the engine, based on predetermined relationships between those control parameters calibrated for the specific engine application, and based on the present engine operating condition.

Such control may not account for manufacturing variations or for disturbances to the control system, for example the inevitable system performance changes due to aging. As such, it is common in the art of engine control to sense the performance of the air-fuel ratio control itself, for example using an oxygen sensor located in the exhaust path of the engine to observe, in a conventional manner, the actual engine air-fuel ratio. The observed (sensed) air-fuel ratio may then be fed back to the engine controller, which may trim (adjust) one of the three control parameters in order to compensate for the variations or disturbances.

In many such systems, fuel is a high resolution control parameter, making it an attractive candidate when precise air-fuel ratio control is desired. However, such systems may be "fuel-lead" systems in that the driver directly sets a fuel command which is directly related to engine torque, and only indirectly sets the air and EGR commands. As such, fuel command adjustments tend to be more perceptible to the driver in these systems. Such perceptibility is generally considered to be a disadvantage, as it disturbs the torque command—particularly in transient maneuvers.

Alternatively, these fuel-lead systems may trim the quantity of air admitted into the engine in engine air-fuel ratio control. Because air, unlike fuel, is not directly controlled by the driver in these systems, air trim is less perceptible to the driver. However, air trim does not provide the resolution available with fuel trim, and air trim can only be used in certain engine operating regions.

Further, these fuel-lead systems may trim the quantity of EGR admitted into the engine for air-fuel ratio control. Like air trim, EGR trim is less likely to be perceived by the driver in many of these systems. Further, when the quantity of EGR and the ratio of fuel to air in the engine rise or fall together, such as when EGR is trimmed for air-fuel ratio control, the desired air-fuel ratio correction may be achieved while limiting the creation of oxides of nitrogen (an undesirable combustion product) in the engine. Still further, the engine spark command is less sensitive to EGR trim than to fuel or air trim. However, EGR is not available or desirable in certain engine operating regions, such as in high engine load regions, or at idle. Further, EGR control does not have the resolution available with fuel control.

In the above-described systems, there are advantages and disadvantages associated with trimming fuel, air or EGR in order to control air-fuel ratio. What is needed is a system control strategy that controls engine air-fuel ratio using all three control parameters in a manner that retains the benefits of each and minimizes their weaknesses.

SUMMARY OF THE INVENTION

The present invention comprises a comprehensive air-fuel ratio control method for an engine controller that is not limited to control of a single engine parameter, but selects and adjusts the parameter best suited to the present engine operating condition.

In general, the method senses the engine operating condition and determines, based on that condition, which control parameter is best suited for air-fuel ratio control in terms of the benefits and detriments it provides at that operating condition.

For example, at low load operating conditions, air has insufficient resolution for air-fuel ratio control. Additionally, EGR is typically not active at such operating conditions, due to concerns over control stability. Accordingly, fuel is the parameter that is trimmed in the closed loop air-fuel ratio control, as it has sufficient resolution for the delicate control in the low load operating region and, as the driver is typically not engaging the accelerator pedal in the low load region, concern that the driver will perceive the fuel trim is minimized.

Engine control systems often abandon stoichiometry at extremely high engine loads, allowing the engine to operate with a slightly "rich" air-fuel mixture. Prior to that "extremely high" engine load range, there is a high load range in which it is desirable to maintain a stoichiometric mixture. In this range, air is at or near its maximum flow capacity, providing little usefulness as a control parameter. Controlling around EGR is possible in such a region, but too much EGR can erode engine torque yield, which is generally considered a disadvantage in higher engine load operating ranges. As such, fuel is trimmed in such regions for stoichiometric control.

Finally, in the operating region between the described low and high load regions, EGR may be trimmed in air-fuel ratio control. Fuel is avoided to minimize driver perception of the control. Air trim also may be used for air-fuel ratio control in the region, but EGR trim is preferred thereover in that it is likely to be even less perceptible than air. However, if EGR trim becomes saturated (runs out of authority), the system may further refine the air-fuel ratio by holding the EGR trim steady, and by trimming either air or fuel.

This method combines the advantages of the three potential control variables to provide air-fuel ratio control over the applicable engine operating range that does not substantially compromise power when it is desired, does not compromise control precision, and minimizes driver perception.

DESCRIPTION OF THE ILLUSTRATIONS

FIG. 1 is a general diagram of an engine control system; and

FIGS. 2, 3*a*, 3*b*, 4, 5*a*, 5*b* and 5*c* are computer flow diagrams illustrating the operation of the system of FIG. 1 in accord with the principles of this invention.

DESCRIPTION OF THE PREFERRED EMBODIMENT

Figure 1:
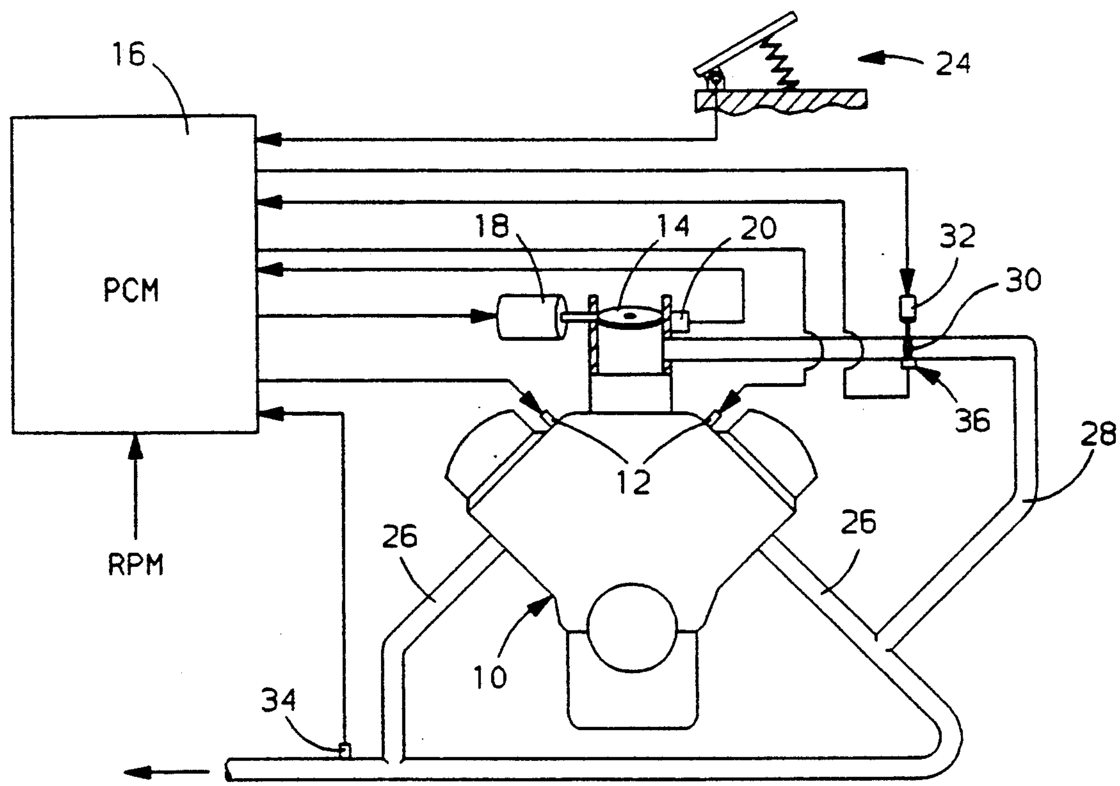

Referring to FIG. 1, an internal combustion engine 10 is provided fuel by some conventional fuel delivery system, such as by fuel injectors 12 mounted in proximity to each of the cylinders of the engine. The injectors may be controlled in a conventional manner, for example by an injection pulse width generated in the powertrain controller PCM 16, the pulse width being indicative of the amount of time an injector should be injecting fuel into the engine 10.

In the preferred embodiment, the quantity of fuel to be administered into the engine is directly related to the driver's request, such as by the driver's positioning of the vehicle accelerator pedal 24. Such systems, often called fuel-lead systems, make the fuel command directly related to the driver's request, and make air and EGR commands only indirectly related to the driver's request.

Air is drawn into the engine through a bore, wherein a throttle valve 14 is located to control the amount of air allowed into the engine according to a command generated by the PCM 16. In this embodiment, the valve consists of a flat blade 14 which rotates with respect to the air inlet according to the angular position of a rotary actuator 18 connected to the blade by a shaft in a conventional manner. The angular position of the actuator is controlled by the PCM 16.

The angular position of the blade 14 is monitored by an angular position sensor 20, such as a conventional rotary potentiometer, mounted in proximity to the blade, for example on the shaft. The position sensor 20 monitors the blade angle and transmits the measurement to the PCM 16. The inventors contemplate that other air control means may be used in the system incorporating this invention, such as engine valve control which meters the air ingested into the engine via PCM controlled valve lift actuators.

An apparatus 24 by which the vehicle operator may apprise the PCM 16 of a desired engine operating point is located in the vehicle passenger compartment. This apparatus may simply be a conventional accelerator pedal 24, with a pedal position sensor associated therewith so as to monitor the pedal position and transmit the measurement to the PCM 16.

The fuel injected into the engine 10 by means of the fuel injectors 12 is combined with air admitted into the engine by the throttle valve 14, and is distributed to the engine cylinders, where it is ignited in a conventional manner, the product of the ignition being expelled as exhaust gas through an exhaust conduit 26.

A closed conduit 28 is attached between the engine exhaust conduit 26 and the intake manifold for transporting a quantity of the exhaust gas back to be recirculated into the engine 10 with the engine intake air, according to the conventional process of exhaust gas recirculation EGR.

A valve 30 is situated in the conduit 28 to meter the quantity of exhaust gas recirculated. The valve 20 can be any conventional valve capable of controlling the flow of a gaseous substance, such as a conventional butterfly valve. The valve is controlled by a rotary actuator 32 which may be connected to the valve 30 by a common drive shaft. The actuator 32 is controlled according to a command generated in the PCM 16. The position of the valve is monitored by a conventional valve position sensor 36, such as a rotary potentiometer, located in proximity to the EGR valve. The measured EGR position is transmitted to the PCM 16.

The ignited air-fuel mixture creates a force which ultimately rotates the crankshaft of the engine in the usual manner. A conventional rotational speed sensor (not shown) is located in proximity to the crankshaft of the engine 10 to sense the rotational speed of the crankshaft. The sensed value is transmitted to the PCM 16 as a measurement of engine speed RPM.

A conventional oxygen sensor 34 is located in proximity to the engine exhaust conduit in such a manner that a substantial portion of the engine exhaust gas flows by the sensor. The sensor generally indicates the oxygen content in the exhaust gas, the indication being transmitted to the PCM 16. The PCM periodically reads and categorizes the indication as describing a "rich" engine operating condition, where the ratio of air to fuel is below the stoichiometric ratio, or a "lean" operating condition where the air to fuel ratio is above the stoichiometric ratio.

In predetermined engine operating regions, the PCM will attempt to maintain the air to fuel ratio close to the stoichiometric ratio. Necessarily, such operation will cause frequent switching of the oxygen sensor indication from a "lean" indication to a "rich" indication. The PCM, in a conventional manner, categorizes the sensor indication as either rich or lean. Once categorized, the air-fuel ratio status is stored in memory for use in accord with the principals of this invention.

The PCM 16 takes the form of a standard digital computer, such as a Motorola MC68HC11 single chip microcomputer. The principles of this invention are implemented in the form of an operating program stored in the computer's memory.

Automotive engine air-fuel ratio control methods attempt to drive the actual air-fuel ratio to a desired value when operating in predetermined operating ranges. Fuel-lead engine control systems, which are systems that directly control fuel as a function of an operator command such as the operator's positioning of the vehicle accelerator pedal, and that control air, EGR and spark corresponding to the fuel command, will adjust (trim) only one of the fuel, air, and EGR commands to correct for deviations from the desired air-fuel ratio. Often, such adjustments are stored in a memory location corresponding to a "cell" pertaining to the operating conditions at which the adjustment was deemed necessary.

The engine operating region in which closed loop air-fuel ratio control is to be carried out may be divided into a predetermined number of such cells. The values in the memory locations corresponding to these cells are initialized (or re-initialized after memory has been cleared) to values corresponding to "no correction". Later, when operating in a certain cell, any air-fuel ratio adjustments made will be recorded in some conventional fashion in the cell. The active cell value will then be used in the ultimate calculation of the desired quantity of the parameter to be admitted into the engine.

It has been shown that certain engine operating regions are better suited to say, fuel trim, while others are be better suited to either air or EGR trim. The present invention takes this information into account in that it does not limit the parameter to be trimmed to any one of the three mentioned parameters, but trims the parameter that provides the most desirable operation depending on the present engine operating point.

In this embodiment, each operating cell may be defined by engine operating conditions, such as by engine speed or engine load or both. A series of operating cells over the engine operating range is provided for in system memory in the form of a memory lookup table. In this embodiment, one lookup table is provided in non-volatile memory to store block learn values for each of the three engine control parameters of air, fuel and EGR. Individual entries in the above-described tables contain closed loop control information for the cell associated therewith.

In accord with the principles of this invention, while closed-loop air-fuel ratio control is active, only one of the three of air, fuel, or EGR will be active for air-fuel ratio control. The active parameter has a closed loop correction factor CLCF which is adjusted in a rapid manner in response to the sensed actual air-fuel ratio and a block learn table, one value within the table being adjusted more slowly than the CLCF, in response to the CLCF. In general, the CLCF value and the value in the block learn table as adjusted are used to drive the actual engine air-fuel ratio toward the stoichiometric air-fuel ratio.

For example, the CLCF value associated with the active parameter is trimmed or adjusted rapidly in accord with a short time constant in response to the rich or lean output of the oxygen sensor 34 and in direction to restore the air-fuel ratio to the stoichiometric ratio. The rapid response is primarily used to provide quick compensation for variations in the air-fuel ratio from stoichiometry. The CLCF value is a multiplier which, when increased in magnitude increases the air-fuel ratio, and when decreased in magnitude decreases the air-fuel ratio. The fuel, air, and EGR commands are multiplied by their CLCF multipliers before the commands are issued to the respective actuators. In this embodiment, a CLCF value of 128 represents no correction to the command, or a unity gain multiplier, with the value being increased or decreased therefrom as necessary. The three CLCF values are stored in volatile memory.

The value associated with the active cell in the block learn table that is operating is trimmed or adjusted more slowly than the CLCF values, but still is adjusted to drive the actual air-fuel ratio toward stoichiometry. There is one block learn value available for each cell in the tables associated with each of fuel, air and EGR. The individual block learn values, instead of being trimmed directly in response to the actual air-fuel ratio as sensed by the oxygen sensor 34, are rather adjusted according to the state of the corresponding CLCF value. However, the effect of trimming the block learn values is the same as the effect of trimming the CLCF values. For example, increasing the block learn value will increase the air-fuel ratio, and decreasing the block learn value will decrease the air-fuel ratio. Further, like the CLCF values, a block learn value of 128 represents unity gain, and the value is increased or decreased therefrom as necessary.

The active block learn value is adjusted in the same direction as the corresponding CLCF value, so as to ultimately drive that CLCF value back toward the unity gain value. For example, if the CLCF value corresponding to the one of fuel, air, and EGR that is active is increased beyond its unity value, the corresponding block learn value is, in time, increased. The effect of the block learn increase is an increased air-fuel ratio which, when sensed by the oxygen sensor 34, will force the corresponding CLCF value back toward the unity gain value.

The adjustment of the block learn value is slow in accord with a long time constant. As such, unnecessary excursions are avoided, such as from CLCF response to transient disturbances in the system, such as sensor noise. Unlike the CLCF values, the block learn values are stored in non-volatile memory to provide a long-term correction to the evolving needs of the system. They are intended to provide a more permanent, more careful adaptation to system changes than the CLCF values. By combining the CLCF values with the block learn values, the system has the capacity to quickly respond to changing system needs (via the CLCF values), while "remembering" any adjustments needed to operate at the desired air-fuel ratio in the longer term (via the block learn values).

Figure 2:
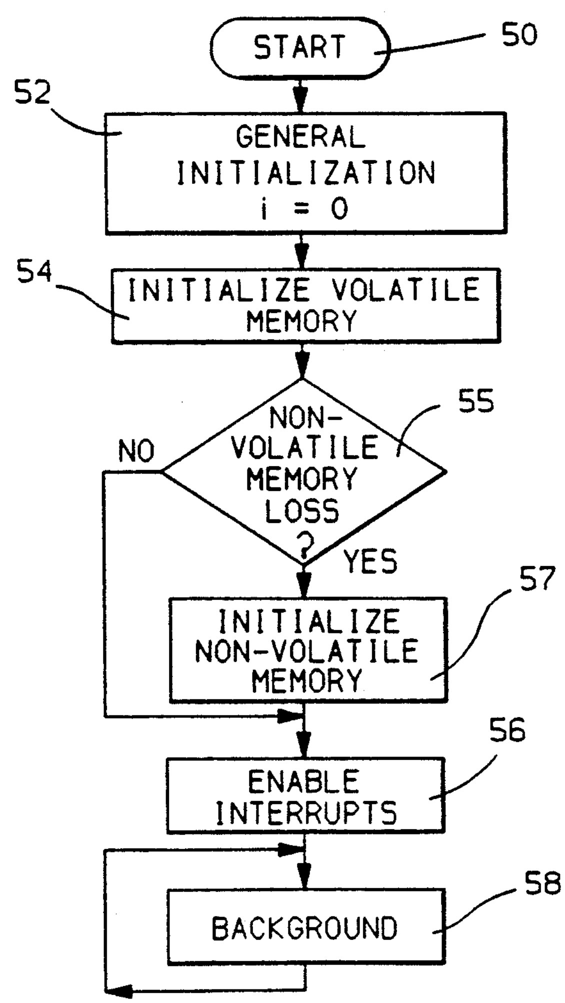

Referring to FIG. 2, when power is first applied to the system, such as when a conventional vehicle ignition switch is turned to its "on" position, the PCM initiates the engine control program at step 50 and then proceeds to step 52 where the PCM provides for system initialization. For example, at this step data constants are transferred from read only memory locations to random access memory locations and counters, flags and pointers are initialized. Additionally at this step, a general counting variable is initialized to zero.

The routine then proceeds to step 54 where the above described three closed-loop correction factors CLCFs are initialized. The CLCF values are stored in volatile memory, such that they must be initialized at step 54 whenever memory keep-alive power is dropped. In the preferred embodiment, these values are initialized to 128, which corresponds to a unity gain factor in the closed loop control, as discussed.

The routine then proceeds to step 55, to determine whether there has been a loss of non-volatile memory since the last operation of the PCM, for example by a battery disconnect or by some system power failure. If such a memory loss has occurred, the routine proceeds to step 57, to initialize non-volatile memory to appropriate initial values. Most importantly in the context of the present invention, block learn values stored in the three block learn tables are initialized to 128 (a unity gain value in this embodiment) at this point.

Next, or if there has been no loss of non-volatile memory, the routine moves to step 56 where interrupts used in vehicle control, including engine control in accord with this invention, are enabled. The interrupt pertaining to execution of the routine incorporating the principles of this invention, called the real-time interrupt, is enabled at this step to occur approximately every 6.25 milliseconds. The PCM then proceeds to a background loop at step 60 which is continuously repeated. This loop may include system diagnostic and maintenance routines. In this embodiment, the PCM interrupts the background loop upon occurrence of the real-time interrupt to execute a general real-time interrupt service routine incorporating the principles of this invention.

Figure 3A:
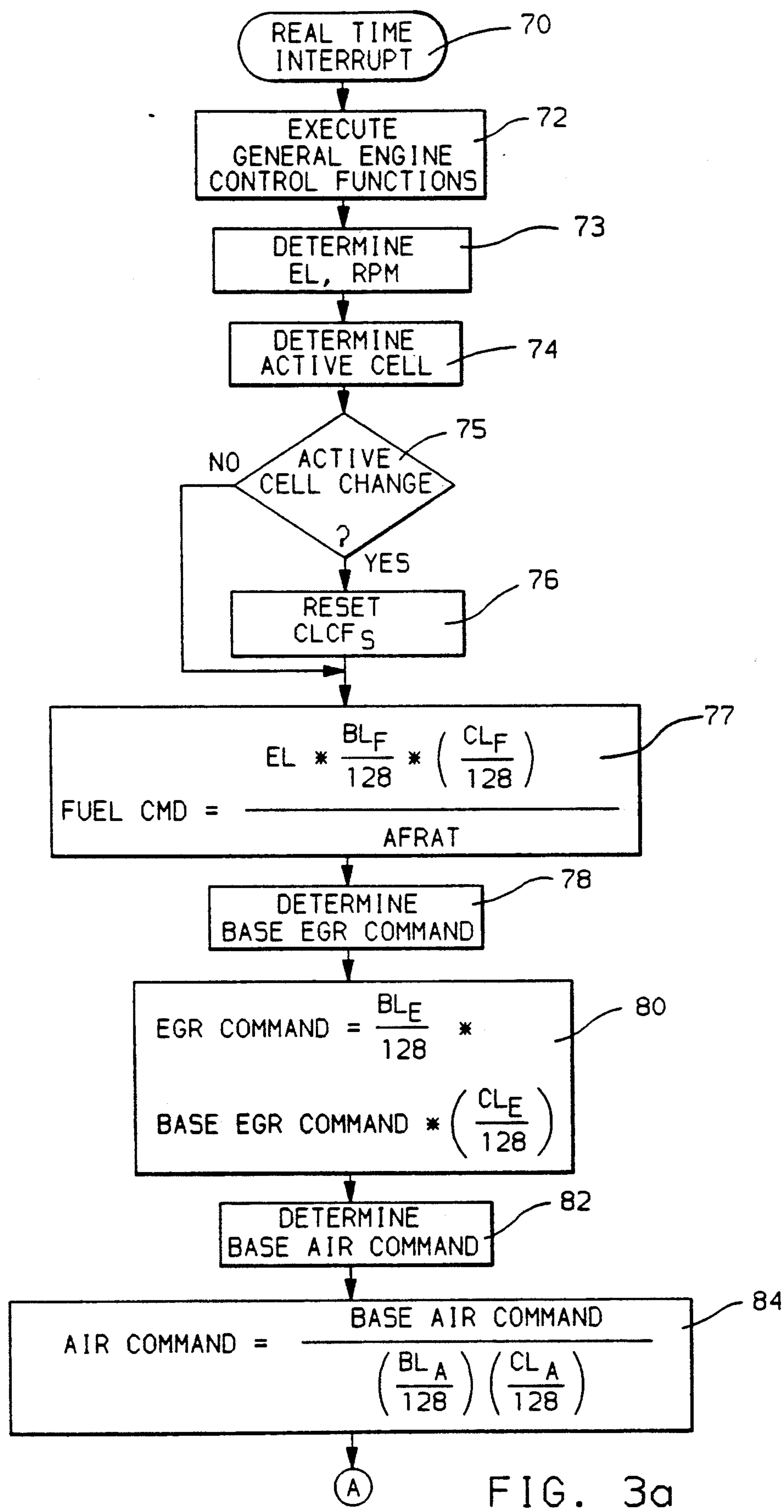
Figure 3B:
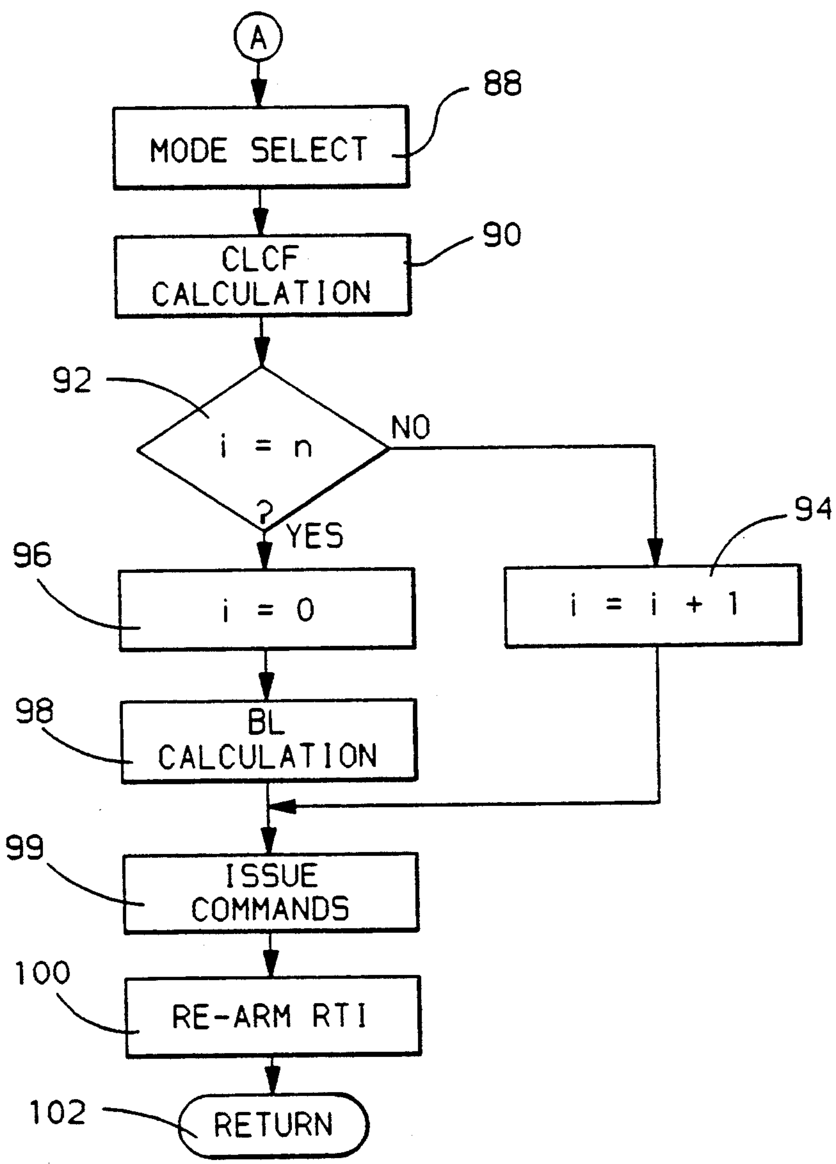

This general routine is illustrated in FIG. 3, and is entered at step 70. The PCM proceeds to step 72 to execute general engine control functions well known in the art of engine control, especially those functions necessary for execution of the routine incorporating the principles of this invention. For instance, at this step a desired idle air command is generated, and the engine air-fuel ratio AFRAT is calculated.

The routine then proceeds to step 73 to determine engine load EL, and engine speed RPM. These two values are commonly used in engine control as indicative of the engine operating point. EL may be calculated as a function of the operator requested engine operating point, such as from the position of an accelerator pedal in a vehicle, and RPM may be determined in a conventional manner, such as from a sensor located in proximity to an engine output shaft that rotates at a speed proportional to the engine speed.

The routine then advances to step 74, to determine the active cell to be used in the current iteration of this routine for the purpose of trimming one of air, fuel, or EGR in accord with this invention. As discussed, the active cell is related to the engine operating point, which may be ascertained from the above-determined engine load and speed.

The routine then moves to step 75 to ascertain whether the engine operating point has changed to the extent that the present active cell as determined at step 74 differs from the cell that was active in the previous iteration of this routine. If so, the routine proceeds to step 76, where the three CLCF values may be reset to their unity gain values, as any air-fuel ratio correction information that may have been contained in the CLCF values from the previous iteration may not be in accord with the needs of the engine in its current operating state. Accordingly, that potentially obsolete information may, at the option of the system designer, be discarded, and new corrections may take place which are more likely to be in accord with the needs of the engine in its current operating state.

Next, or if the active cell did not change, the routine moves to step 77, to determine a fuel command in a conventional manner, according to the following equation $$\text{Fuel Command} = (EL * BL_F/128 * CL_F/128)/(\text{AFRAT})$$

where EL is engine load, $BL_F$ is the block learn value associated with the active cell in the fuel block learn lookup table, $CL_F$ is the fuel closed loop correction factor, and AFRAT is the calculated actual engine air-fuel ratio. As discussed, the value 128 represents unity gain for both the block learn value and the closed loop correction factor. This is illustrated in the above fuel equation, where both of these values are divided by 128.

After computing the fuel command, the routine proceeds to steps 78 and 80, to compute the desired EGR command. First, at step 78, a base EGR command is calculated. The routine for computing the base EGR command may be any conventional EGR computation routine which determines a desirable quantity of exhaust gas to be recirculated into the engine intake to be combined with the engine intake air. After computing the base EGR command, the overall EGR command is calculated at step 80 in a conventional manner.

In the preferred embodiment, the overall EGR command is calculated according to the following equation $$\text{EGR Command} = BL_E/128 * \text{base EGR command} * CL_E/128$$

where $BL_E$ is the block learn value associated with the active cell in the EGR block learn lookup table, and $CL_E$ is the EGR closed loop correction factor. Both $BL_E$ and $CL_E$ are divided by 128 for scaling purposes, as in the case of the already discussed fuel command calculation. The calculation at step 80 merely trims the conventional base EGR command according to the previously calculated stored block learn and CLCF values, so as to drive the actual air-fuel ratio toward the desired air-fuel ratio.

Next, at steps 82 and 84, the desired quantity of air to be admitted into the engine is calculated. First, at step 82, a base air command is determined. This term is used as a general purpose calibration factor that may be determined in a conventional engine calibration process, as a desired amount of air to be admitted into the engine at the current engine operating point. In this embodiment, the base air command is determined as a function of the engine operating range as indicated by engine speed and engine load, and further is based on the ratio of the total air charge (including both the quantity of EGR admitted to the engine and the quantity of "fresh" air admitted to the engine) to the fresh air charge.

After determining the base air command, the routine advances to step 84, to determine the air command according to the following equation $$\text{Air Command} = \text{base air command}/((BL_A/128) * (CL_A/128))$$

where $BL_A$ is the block learn value associated with the active cell in the air block learn lookup table, $CL_A$ is the air closed loop correction factor, and $BL_A$ and $CL_A$ are divided by 128 for scaling purposes, as discussed above for the fuel and EGR command calculations.

After computing the air command, the routine proceeds to step 88, to select an air-fuel ratio trim mode in accord with the principles of this invention. The mode select is carried out by the routine illustrated in FIG. 4, and will be discussed shortly.

Figure 4:
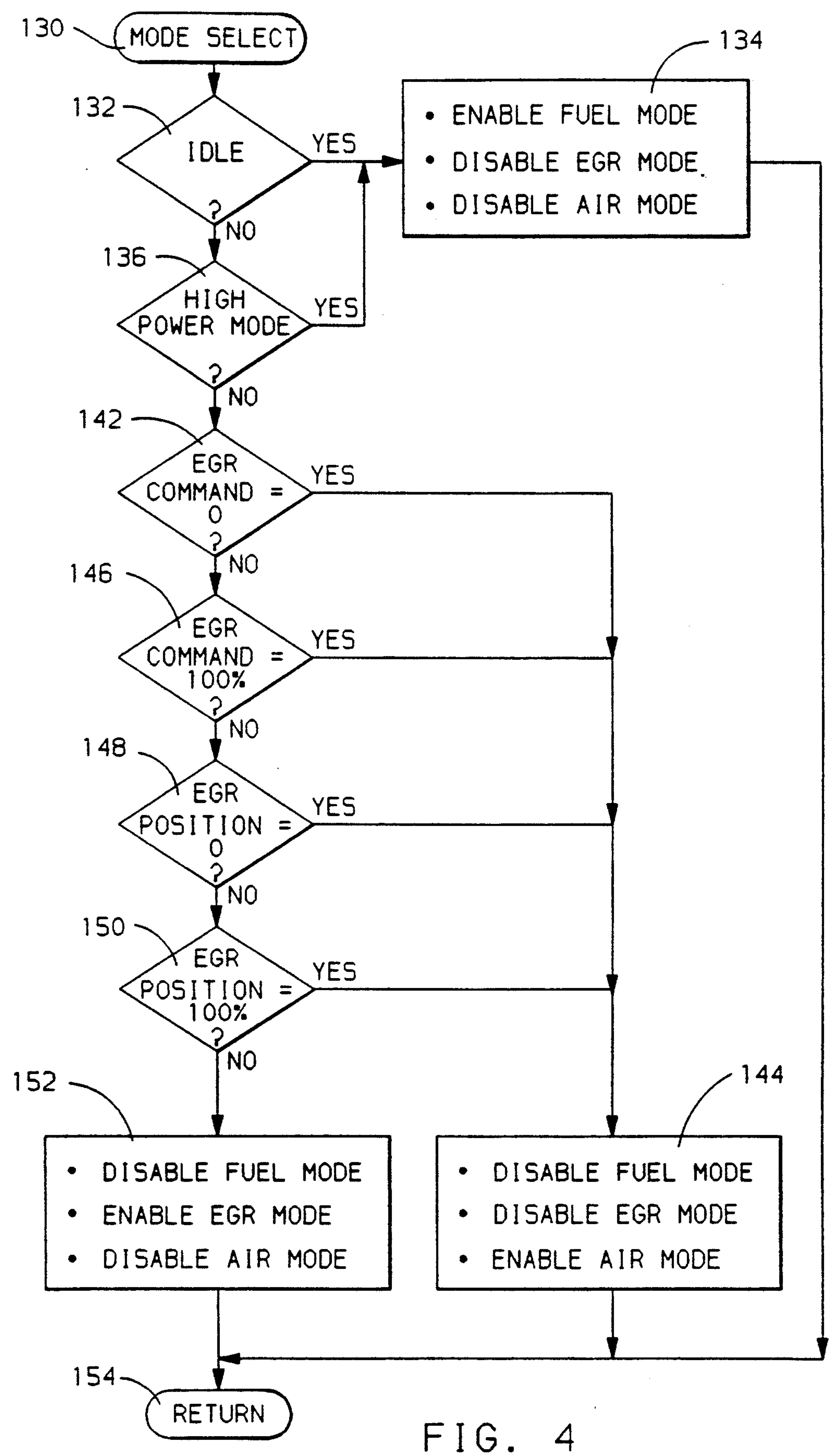

The routine then proceeds to step 90, to perform any necessary adjustments of the closed loop correction factor CLCF for the active one of fuel, air, and EGR parameters, as selected in the routine illustrated in FIG. 4. The CLCF adjustment step is well known in the art of engine air-fuel ratio control, as discussed. In this embodiment, an adjustment may be made once per real-time interrupt, so as to provide quick response to the evolving needs of the system.

After adjusting the CLCF value, the routine proceeds to steps 92 through 98, to make any necessary adjustments to the block learn value associated with the active cell in the block learn lookup table corresponding to the mode selected in the routine illustrated in FIG. 4. The block learn adjustment, unlike the CLCF adjustment, is not carried out each time the real-time interrupt service routine is executed, but rather is carried out after a predetermined number of real-time interrupts occur. For instance in the preferred embodiment, it is desired that the block learn values be updated approximately every 200 milliseconds, which requires about 32 iterations of the real-time interrupt between successive iterations of the block learn adjustment routine.

Accordingly, at step 92, a general counting value i, which is reset upon system power-up at step 52 of the routine illustrated in FIG. 2, and is incremented upon every execution of the real-time interrupt service routine, is compared to a predetermined value n. If i equals n, the routine proceeds to step 96 to reset i so as to set up the next delay period. The routine then proceeds to step 98 to carry out the block learn routine, which is illustrated in FIG. 6, and will be described shortly.

Returning to step 92, in the preferred embodiment, the value of n is set to 32 so as to provide approximately a 200 millisecond delay period between successive executions of the block learn calculation routine.

After executing the block learn calculation routine at step 98, the routine moves to step 99, to issue, in any conventional manner the above determined commands to their respective actuators so as to administer the desired amount of fuel, EGR and air to the engine. Next, the routine proceeds to step 100, to re-arm the real-time interrupt in preparation for the next iteration of this routine. The routine then moves to step 102, where it returns to the background loop illustrated as step 58 in FIG. 2.

Returning to step 92, if i does not equal n, meaning that 200 milliseconds have not yet passed since the previous iteration of the block learn calculation routine, the routine proceeds to step 94, to increment the counter as an indication that the routine is one step closer to another execution of the block learn calculation routine. The routine then proceeds to step 100 to re-arm the real-time interrupt, and then returns to the background loop of FIG. 2, via step 102, as discussed.

The mode select routine, called from step 88, is illustrated in FIG. 4, and is entered at step 130. This routine generally selects the operating parameter to be adjusted so as to drive the air-fuel ratio toward a desired air-fuel ratio. As previously discussed, the engine air-fuel ratio may be "fine-tuned" by trimming or adjusting the quantity of fuel, air or EGR admitted into the engine, assuming the engine has the capacity to control each of these quantities.

Practical constraints exist in conventional engine control that make it advantageous to trim some engine parameters in certain engine operating ranges, and other parameters in other ranges. Further, certain parameters simply cannot be used in some engine operating ranges. For instance, when the engine of many conventional systems is operating at idle, air cannot be trimmed, as the air valve is near closed, and has poor resolution. Similarly, in high power modes of operation, air typically cannot be trimmed because the air valve is likely to have run out of authority.

It is well known in the art that EGR control has an undesirable effect on idle stability, and as such should not be used at idle. Further, EGR trim is generally avoided in high power modes of operation, as it can attenuate engine power. Still further, EGR trim has limited authority, such that even extreme (minimum or maximum) amounts of EGR trim may not provide sufficient air-fuel ratio compensation.

Fuel trim is generally only used in engine operating ranges where air and EGR trim cannot or should not be used, as fuel trim is typically more perceptible to the driver in any operating range, which is considered to be a disadvantage in engine control.

The routine of FIG. 4, in accord with the principles of this invention, accounts for the above described advantages and disadvantages associated with trimming the three control parameters in engine control by selecting the parameter considered to provide the most benefit at the most recent sensed engine operating conditions. The closed loop correction factor associated with the selected parameter and the block learn value for the cell corresponding to the present engine operating conditions for that selected parameter will then be trimmed as necessary for air-fuel ratio control at steps 90 and 98 of the routine of FIG. 3, as discussed.

Additionally, if EGR trim is determined not to provide sufficient compensation at its extreme values, supplemental compensation may be provided by trimming fuel or air. In this embodiment, air is selected in the routine of FIG. 4 as the parameter by which the additional compensation is provided when EGR trim is found to be inadequate for complete compensation.

Specifically, the routine starts at step 130 of the routine illustrated in FIG. 4, and proceeds to step 132 to determine if the engine is in an idle state. The idle state may be diagnosed using the most recent measurements of engine speed and engine load in a conventional manner. If the engine is in an idle state, the above discussed practical considerations make it most beneficial to use fuel trim to control air-fuel ratio. As such, the routine proceeds to step 134 to enable fuel mode, and to disable the other two modes, which may have been active from a previous iteration of this routine. The routine then proceeds to step 154 where it is directed to return to the calling routine shown as step 88 of the routine illustrated in FIG. 3.

If the engine is determined not to be in an idle mode, the routine proceeds to step 136, to determine whether the engine is operating in a high power mode. The high power mode may be determined by comparing the present engine speed and load to a predetermined speed and load range, the range corresponding to the high power mode range. The high power mode may be any mode where it is considered advantageous to continue closed loop engine air-fuel ratio control using feedback from some air-fuel ratio sensing device, such as a conventional oxygen sensor, but where high power operation is desired.

Typically, conventional engine control allows open loop engine operation in the highest power range, mainly for engine power enhancement. This invention recognizes an engine operating range just below the highest power range, where closed loop control is still desirable, due to its beneficial impact on engine efficiency and engine emissions. However, it is still considered important to provide the highest power possible within certain well recognized limits. As such, and for the above discussed practical considerations, fuel is selected as the parameter to be trimmed, if necessary. Accordingly, if it is determined at step 136 that the vehicle is operating in the high power mode, the routine proceeds to step 134, to select fuel mode. The routine then returns to its calling routine via step 154, as discussed.

If it is determined that the engine is not operating at idle or in the high power mode, the engine is classified as being in an intermediate region of operation wherein it is considered most beneficial to use EGR trim to control the engine air-fuel ratio, to the extent possible.

The advantages of using EGR for this purpose are commonly understood by those with ordinary skill in the art of engine control. For instance, it is common in fuel-lead systems, such as the system in this embodiment, that EGR trim provides the least perceptible compensation to the air-fuel ratio. Further, EGR compensation is known in such systems to be less sensitive to perturbations than either air or fuel, providing smoother compensation. However, it has been determined that, under certain engine operating conditions, EGR may run out of authority, as discussed. In such cases, compensation from another of the three parameters is necessary for adequate air-fuel ratio control.

In accord with the principles of this invention, air trim or fuel trim may be used to further compensate in cases where EGR is saturated high or low. Accordingly, steps 142, 146, 148, and 150 attempt to determine whether EGR is, in fact, saturated. If so, in the preferred embodiment, air trim is effected to provide the further compensation. However, the inventors contemplate that fuel trim may also be used to provide further compensation.

Specifically, the routine proceeds to step 142 to determine if the most recent EGR command is at the minimum possible command, zero EGR. If so, it is maintained at zero for the present iteration of the routine, and the air mode is activated at step 144, such that any further adjustments to the air-fuel ratio for the present iteration will be carried out via air trim. After enabling the air mode, the routine moves to step 154, where it is directed to return to the calling routine illustrated as step 88 of FIG. 3.

If the present EGR command is not at its minimum value, the routine proceeds to step 146, to determine if the EGR command is at the maximum possible command, or 100 per cent EGR. If so, the maximum command is maintained as such for the present iteration, and the air mode is activated at step 144, such that any further adjustments to the air-fuel ratio for the present iteration will be carried out via air trim. The routine then returns to its calling routine via step 154, as discussed.

Beyond checking the EGR command, the routine checks for a system failure that may have resulted in the EGR valve being fully open or fully closed. Such an EGR valve position would be a fault if detected at steps 148 or 150, in that the only way to execute either of these steps is if the EGR command is not at zero or 100 percent at steps 142 or 146. Accordingly, if the EGR valve is detected to be at zero or 100 per cent at steps 148 and 150, it is in disagreement with the commanded EGR position, and a fault is assumed to exist. In such a case, further EGR trim for the present loop is discontinued, and either air trim or fuel trim is substituted therefor. In the preferred embodiment, air trim is used as the substitute parameter, but the inventors envision fuel trim as also being a suitable substitute.

Specifically, the routine proceeds to step 148 to check the EGR position, via the EGR valve position sensor 36. If the EGR sensor substantially indicates zero EGR, the routine proceeds to step 144, to enable air mode and to disable EGR and fuel modes. The routine then advances to step 154, where it is directed to return to the calling routine of FIG. 3, as discussed.

Alternatively, if at step 148, the EGR position is not substantially zero, the routine proceeds to step 150, to determine whether the EGR valve is at a substantially fully open position. If the EGR valve position sensor 36 indicates that the valve is substantially fully open, which would be in disagreement with the result seen at step 146, a fault is assumed, and the routine proceeds to enable air mode and disable both EGR and fuel modes at step 144. The routine then proceeds to step 154, where it is directed to return to the calling routine of FIG. 3, as discussed.

However, if the EGR valve position sensor 36 does not indicate that the valve is substantially fully open, the routine proceeds to step 152, where EGR mode is enabled, and both air and fuel modes are disabled. As illustrated in FIG. 4, EGR is only enabled, i.e. step 152 is only executed, if the EGR valve is in such a position that it has authority to move in both a closing and an opening direction, and if it is not detected to be faulty. After enabling EGR and disabling both air and fuel, the routine proceeds to step 154, where it is directed to return to the calling routine of FIG. 3, as discussed.

Figure 5A:
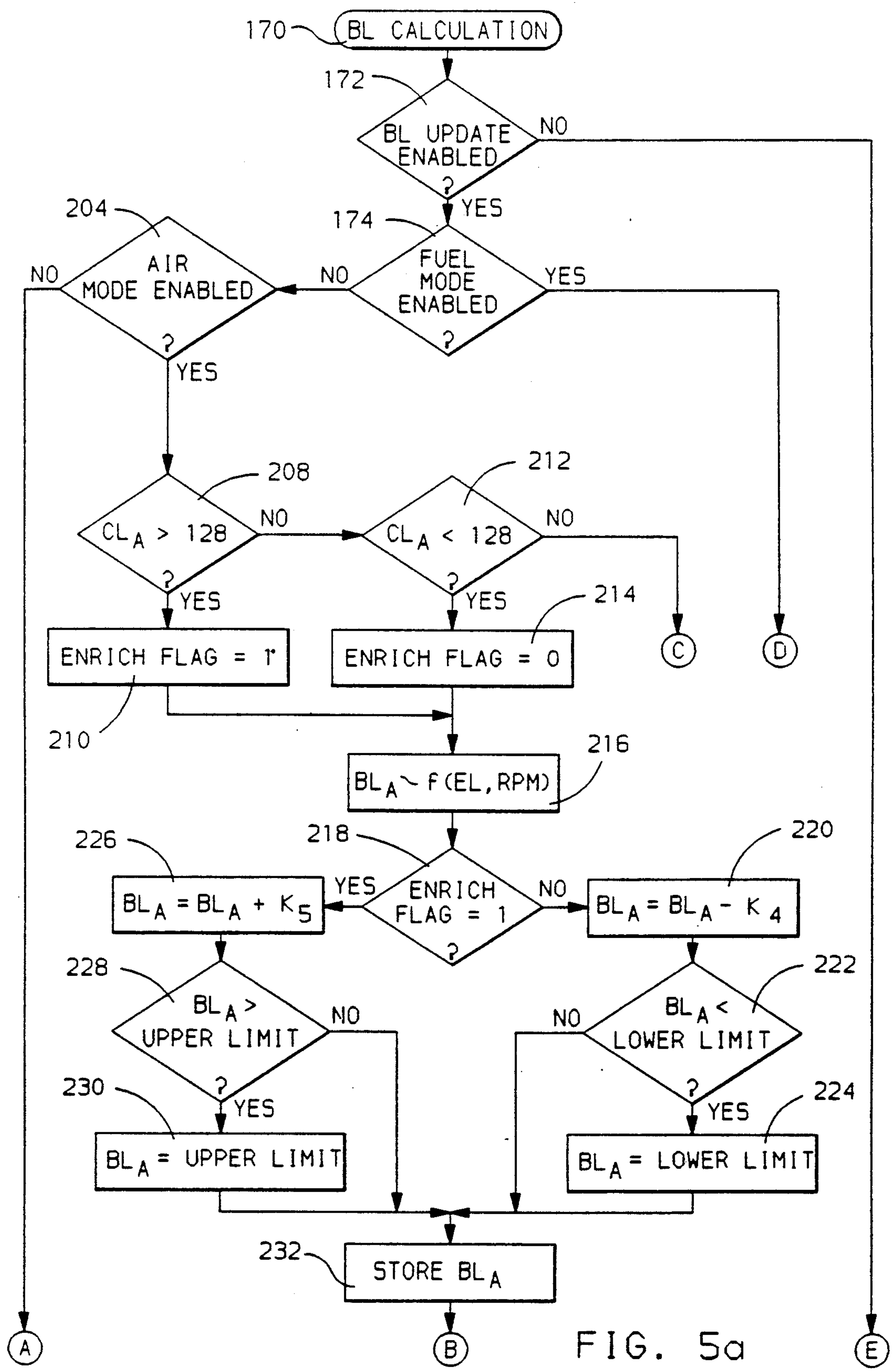
Figure 5B:
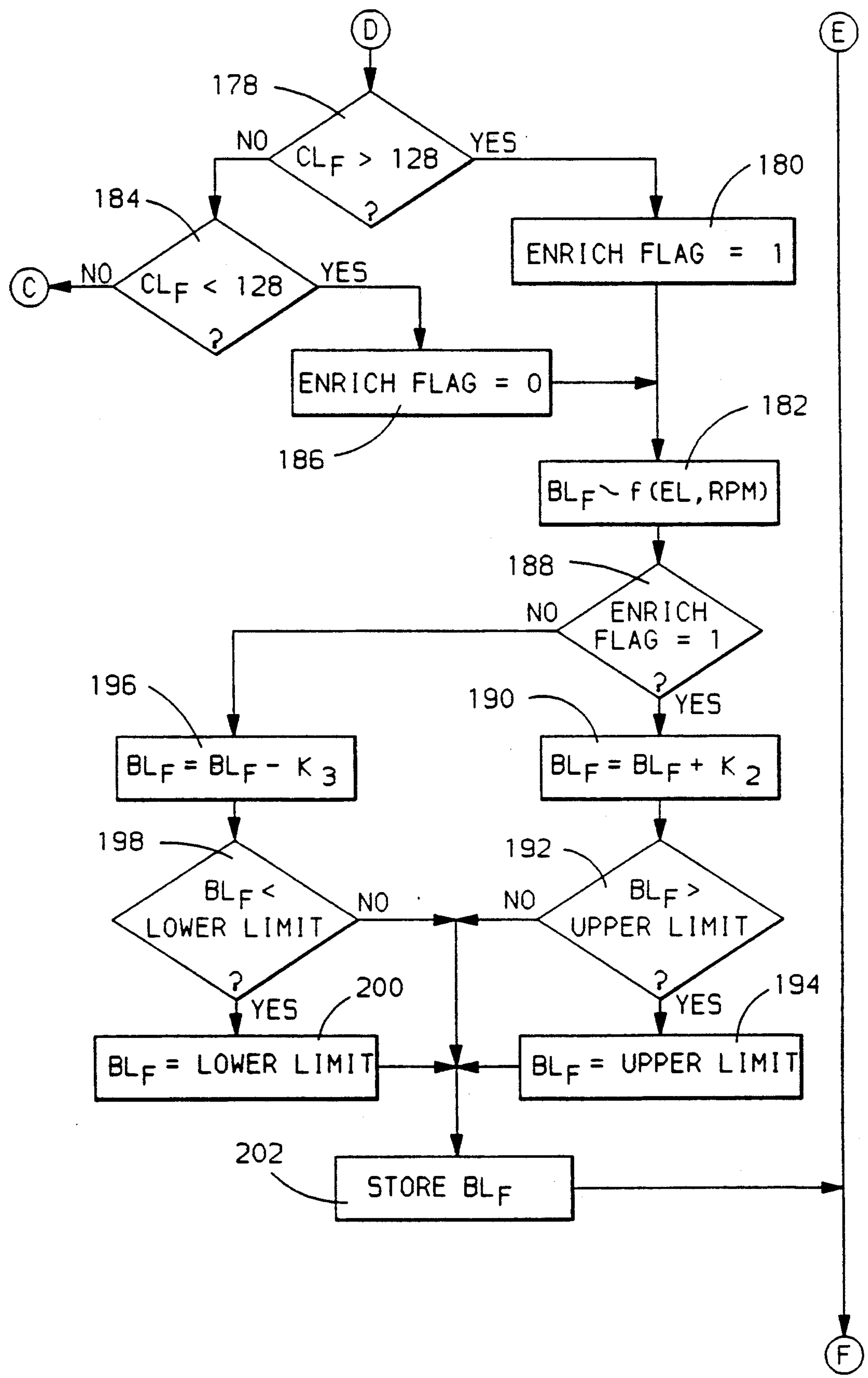
Figure 5C:
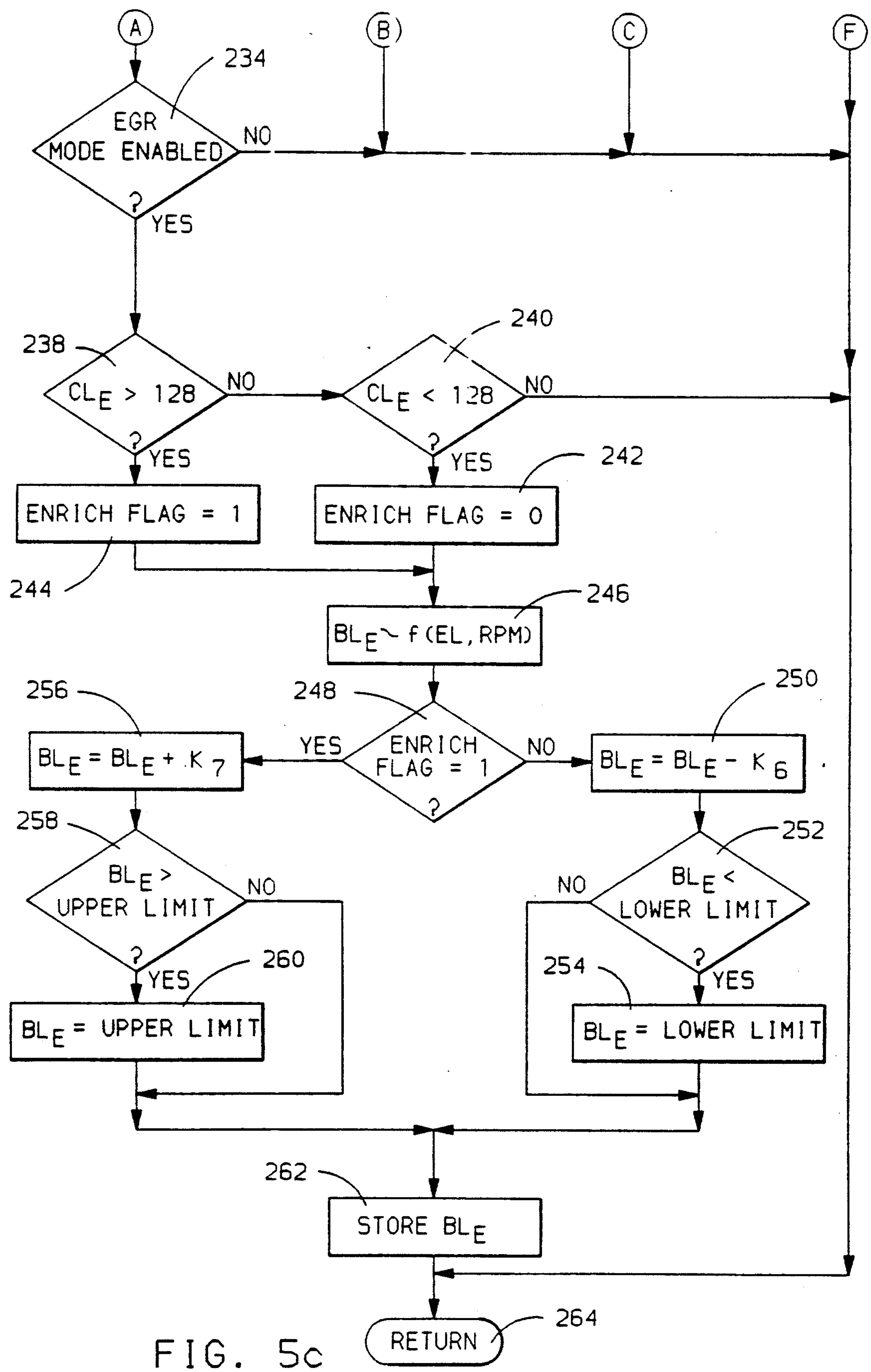

FIG. 5 illustrates the routine to trim or adjust the specific block learn value for the selected active cell (corresponding to the most recent sensed engine operating state) in the block learn lookup table corresponding to the mode that is active. Generally, this routine modifies the selected block learn value so as to ultimately drive the associated closed loop correction factor (CLCF) to zero. As described earlier, for each of fuel, air and EGR, the engine operating region is divided into a series of subregions or cells, each cell having both a block learn value and a closed loop correction factor CLCF.

Accordingly, for any engine operating region in which closed loop air-fuel ratio control is desired, one of the three parameters may be trimmed to provide precise air-fuel ratio control in accord with the principles of this invention. FIG. 5 illustrates the routine where the block learn values are adjusted to accommodate for the evolving needs of the system, in an attempt to adapt the control in response to variations in the performance of the various parts of the engine control system.

Specifically, the block learn calculation routine is entered at step 170. The routine proceeds to step 172, to determine if the block learn update is enabled. The update may be enabled if there are no perceived substantial failures in the closed loop air-fuel ratio control system, or if the system is operating in an engine operating range where closed loop control is considered beneficial.

For instance, conventional engine control systems may run "open loop" or without oxygen sensor feedback while the engine is cold or while operating in a very high power range, as indicated by engine load or engine speed. In such cases, the block learn update, as checked at step 172, may be disabled in a conventional manner. Upon detecting such a disablement, the routine of FIG. 5, at step 172, will terminate by proceeding to step 264, where it is directed to return to the calling routine of FIG. 3.

If the block learn is enabled at step 172, the routine proceeds to step 174, to determine whether the fuel mode has been enabled by the most recent iteration of the routine of FIG. 5. If fuel mode is enabled, the routine then proceeds to step 178, to determine whether $CL_F$ has been increased beyond its "unity gain" value (which is 128 in this embodiment), indicating that step 90 attempted to increase the magnitude of the fuel command so as to drive the actual air-fuel ratio toward the desired air-fuel ratio. If such an increase has taken place, the routine proceeds to step 180, to set the enrich flag, for example by setting it to a digital one, as an indication that the fuel block learn value corresponding to CLF must itself be increased so as to drive the CLCF value back toward its "unity gain" value, per the discussed role of the block learn value.

Alternatively, if $CL_F$ has not been increased to a value beyond its "unity gain" value, the routine proceeds to step 184 to ascertain whether $CL_F$ has been decreased below its "unity gain" value, indicating that step 90 attempted to decrease the magnitude of the fuel command so as to drive the actual air-fuel ratio toward the desired air-fuel ratio. If, at step 184, such a decrease is found, the routine proceeds to step 186, to clear the enrich flag, for example by setting it to a digital zero, as an indication that the quantity of fuel delivered to the engine must be decreased in order to drive the corresponding $CL_F$ value toward its "unity gain" value.

If $CL_F$ has not been decreased below its "unity gain" value, the routine terminates, by proceeding to step 264, where it directed to return to the calling routine illustrated in FIG. 3. Termination of the routine is proper, as no adjustment of the block learn value is assumed to be necessary when the corresponding CLCF value has not been adjusted in either direction.

After setting the enrich flag at step 180, or clearing it at step 186, the routine proceeds to steps 182 through 202 to trim the corresponding fuel block learn value so as to drive $CL_F$ back toward its "unity gain" value.

Specifically, at step 182, the routine looks up the specific block learn value $BL_F$ for the selected cell in the block learn lookup table corresponding to the mode that is active (fuel mode is active at this point in the routine). The found value $BL_F$ will be adjusted during the remaining steps of this iteration of the routine illustrated in FIG. 5.

The routine next proceeds to "trim" $BL_F$, in accord with principles of this invention in steps 188 through 202. First, the routine checks the status of the fuel enrich flag to determine whether $BL_F$ must be increased (enrich flag set), which will increase the amount of fuel per unit air into the engine, or whether $BL_F$ should be decreased (enrich flag clear) which will decrease the amount of fuel per unit air into the engine.

If the fuel enrich flag is set, the routine proceeds to step 190, to increase $BL_F$ by an amount $K_2$. Generally, $K_2$ is an offset or gain, which may be predetermined in a conventional manner, in accord with the desired rate at which the fuel block learn should be adjusted. For instance, in this embodiment, the block learn calculation occurs every 200 milliseconds, such that when fuel mode is active, and when enriching, the fuel block learn will be increased at a rate of $K_2$ points per 200 milliseconds. $K_2$ may be stored in read only memory in the powertrain control module 16.

Enrichment gains, such as $K_2$, are common in the art of engine air-fuel ratio control to provide the necessary block learn response to the engine's evolving air-fuel ratio compensation needs. In this embodiment, different gains are provided for the enrichment and enleanment of all three control parameters, which allows various responses for fuel, air, and EGR trim, according to the needs and goals of the system.

After adding the offset $K_2$ to the fuel block learn value, the routine proceeds to steps 192 and 194 to limit the block learn value, if necessary, to a predetermined maximum value. Such limits are used in conventional systems due to a variety of limitations on the capacity of the system to trim the fuel command. For instance, the value may be limited to prevent an memory overflow, such as what may occur if the value was incremented beyond 255. Additionally, the value may be limited to minimize the potential for disruption when the control moves between cells, for example when the control switches from a cell that has been heavily adjusted to one that has undergone very little adjustment. The limits may be predetermined during engine calibration, in a manner common in the art of engine control.

Specifically, if at step 192 it is determined that $BL_F$ has been incremented to its upper limit, the routine proceeds to limit $BL_F$ to the high limit value at step 194. After limiting $BL_F$, or if no limitation is deemed necessary, the routine proceeds to step 202, to store the trimmed block learn value back in the memory location in the lookup table from which it was referenced above at step 182. After storing the trimmed value, the routine returns to the calling routine of FIG. 3, via step 264.

Returning to step 188, if the enrich flag is clear, indicating that the fuel block learn value must be reduced so as to properly provide air-fuel ratio compensation, the routine proceeds to step 196, Where $BL_F$ is decreased by a predetermined amount $K_3$. $K_3$ is a fuel enleanment gain determined in a conventional manner, so as to provide a desirable response to a need to drive $CL_F$ back to its reset value, as discussed. K3 should be determined in a manner and for reasons analogous to those used in the calculation of the constant $K_2$. $K_3$ may be stored in read only memory in the powertrain control module 16.

After reducing $CL_F$ by the amount $K_3$, the routine proceeds to steps 198 and 200 to check $BL_F$ against a predetermined lower limit, for the reasons set forth above for providing an upper limit on $BL_F$. Specifically, at step 198, if $CL_F$ has been reduced below the lower limit, the routine proceeds to step 200, to limit $CL_F$ to the lower limit. Next, or if $CL_F$ is not below the lower limit, the routine proceeds to step 202, to store the trimmed $BL_F$ in the memory location from which it was originally referenced at the discussed step 182. After storing the trimmed $CL_F$ value, the routine proceeds to step 264, where it returns to the calling routine set out as step 98 of FIG. 3.

Returning to step 174 of FIG. 5, if the fuel mode has not been enabled, the routine proceeds to step 204 to determine if air mode is enabled, per the most recent execution of the routine of FIG. 4. If the air mode has been enabled, the routine executes steps 208 through 232, to trim the block learn value for the selected cell in the air block learn lookup table, in the same manner as was described for trimming the fuel block learn value. If air mode is not enabled, the routine proceeds to step 234 to determine of EGR mode is enabled. If the EGR mode is enabled, the executes steps 238 through 262 to to trim the block learn value for the selected cell in the EGR block learn lookup table corresponding to the mode that is active.

Specifically, if at step 204, air mode is enabled, the routine proceeds to step 208 to determine if $CL_A$ has been increased beyond its "unity gain" value, which is 128 in this embodiment. As discussed, an increase in $CL_A$ indicates that the conventional closed loop correction routine determined, while air mode was enabled, that the air-fuel ratio was too rich, and more air was needed per unit fuel.

If, at step 208, it is determined that $CL_A$ has been increased, the routine proceeds to step 210, to set the enrich flag. Alternatively, if it is determined that $CL_A$ has not been increased, the routine proceeds to step 212, to determine whether $CL_A$ has been decreased below its "unity gain" value, for instance when the CLCF correction routine attempted to enrich the air-fuel ratio while air mode was active. If $CL_A$ has been decreased below 128, the routine proceeds to step 212, to clear the enrich flag.

After setting the enrich flag at step 210, or after clearing the enrich flag at step 214, the routine proceeds to step 216, to select the air block learn value $BL_A$ for the selected cell in the air block learn lookup table corresponding to the mode that is active. The routine then proceeds to step 218, to determine the status of the enrich flag. If the enrich flag is set, the routine proceeds to step 226, to increase the air block learn value by a predetermined amount K5, which is predetermined as the rate at which it is deemed most desirable to increase the air block learn value.

The routine then proceeds to step 228 to limit $BL_A$ to a predetermined upper limit value, in a manner common in the art, for the reasons set forth for limiting the fuel block learn value at step 192. Specifically, at step 228, if BLA has been increased beyond the upper limit value, the routine proceeds to step 230 to limit $BL_A$ to the upper limit value.

After limiting $BL_A$, or if no limit is necessary at step 228, the routine advances to step 232, to store the adjusted $BL_A$ value in the memory location from which it was referenced at step 216.

Returning to step 218, if the enrich flag has not been set, the routine moves to step 220, to reduce $BL_A$ by a predetermined amount, $K_4$. As was discussed for the predetermined constants $K_2$, $K_3$ and $K_5$, the constant $K_4$ is predetermined based on the desired rate of reduction of the air block learn value $BL_A$.

After reducing $BL_A$ at step 220, the routine proceeds to step 222 to limit $BL_A$ to a predetermined lower limit value, if necessary. Specifically, at step 222, if $BL_A$ is less than a predetermined lower limit value, the routine proceeds to step 224, to set $BL_A$ to that lower limit value.

Whether $BL_A$ is limited at step 224 or not, the routine next proceeds to step 232, to store the adjusted $BL_A$ value in the cell from which it was referenced at step 216, the adjusted value replacing the value previously stored in the cell. After storing $BL_A$, the routine proceeds to step 264, to return to the calling routine, shown as step 98 of FIG. 3.

Returning to 204, if the air mode is not enabled, the routine proceeds to step 234, to determine if the EGR mode is enabled, as discussed. If the EGR mode is enabled, an adjustment will be made for the EGR block learn value for the active cell in a manner analogous to that described for the adjustment of the block learn value for both fuel and air. If not, the routine returns to the calling routine via step 264, and no block learn adjustment is made for this iteration of the routine.

However if, at step 234, the EGR mode is enabled, the routine proceeds to step 238, to determine if $CL_E$ has been increased beyond its "unity gain", which is 128 in this embodiment. If, at step 238, it is determined that $CL_E$ has been increased above 128, the routine proceeds to step 244, to set the enrich flag to 1. Alternatively, if at step 238, $CL_E$ has not been increased beyond 128, the routine proceeds to step 240, to make a determination as to whether $CL_E$ has been decreased below its "unity gain" value. If so, the routine proceeds to step 242, to clear the enrich flag. If, at step 240, it is determined that $CL_E$ has not been decreased below 128, the routine proceeds to step 264, where it is directed to return to the calling routine of FIG. 3.

If the enrich flag is set at step 244, or is cleared at step 242, the routine proceeds to step 246, to select the EGR block learn value $BL_E$ from the active cell, i.e. the cell associated with the present engine operating condition, as indicated by the most recent sensed engine speed and load.

Next, the routine advances to step 248 to determine the status of the enrich flag. If the enrich flag is set, the routine proceeds to step 256 to increase the EGR block learn value by a predetermined amount $K_7$. The value $K_7$ is predetermined in a manner common in the art of engine air-fuel ratio control according to the desired rate of increase of $BL_E$.

After increasing $BL_E$, the routine proceeds to step 258, to limit $BL_E$ according to a predetermined upper limit value. As discussed for both fuel and air trim limiting, the limit value is set as the highest tolerable EGR block learn value, as dictated by system performance goals and constraints. If, at step 258, $BL_E$ exceeds the upper limit, the routine proceeds to step 260, to set $BL_E$ to the upper limit. Whether $BL_E$ is limited to the upper limit or not, the routine then proceeds to step 262, to store the adjusted EGR block learn value in the cell that was selected at step 242, the adjusted value supplanting the value previously stored in the cell. The routine then advances to step 264, where it is directed to return to the calling routine in FIG. 3, as discussed.

Returning to step 248, if the enrich flag is not set, the routine proceeds to step 250, to decrease $BL_E$ by an amount $K_6$ which is predetermined according to a desirable rate of decrease of the EGR block learn value. After decreasing $BL_E$ at step 250, the routine proceeds to step 252 to limit $BL_E$ to a predetermined lower limit value, if necessary. Specifically, at step 252, if it is determined that $BL_E$ has been decreased below the lower limit value, the routine proceeds to step 254, to set $BL_E$ to the lower limit value.

Whether $BL_E$ has been limited at step 254 or not, the routine proceeds to step 262, to store the updated $BL_E$ in the cell selected at step 242, the adjusted value supplanting the previous stored value in the cell. Next, the routine advances to step 264, to return to the calling routine shown as step 98 of FIG. 3, as discussed.

The foregoing description of a preferred embodiment for the purpose of describing the invention is not to be considered as limiting or restricting the invention since many modifications may be made by the exercise of skill in the art without departing from the scope of the invention.

The embodiments of the invention in which an exclusive property or privilege is claimed are defined as follows:

1. An apparatus for controlling an air-fuel ratio in an internal combustion engine equipped with an intake manifold, comprising:

means for delivering a quantity of fuel to the engine;

means for sensing the air-fuel ratio in the engine;

means for recirculating a quantity of exhaust gas into the intake manifold of the engine when operating in a predetermined engine operating region;

means responsive to the sensed air-fuel ratio to adjust the quantity of exhaust gas recirculated into the intake manifold of the engine in response thereto when operating in the predetermined engine operating region in direction to maintain the air-fuel ratio at a predetermined air-fuel ratio; and means responsive to the sensed air-fuel ratio to adjust the quantity of fuel delivered to the engine in response thereto when operating in a region other than the predetermined engine operating region in direction to maintain the air-fuel ratio at the predetermined air-fuel ratio.

2. The apparatus of claim 1, further comprising:

means for delivering a quantity of air to the engine;

means for determining when the quantity of exhaust gas recirculated into the engine is at a predetermined limit; and means responsive to the sensed air-fuel ratio to adjust a predetermined one of the quantity of air to be delivered to the engine and the quantity of fuel to be delivered to the engine in response thereto, when operating in the predetermined engine operating region when the quantity of exhaust gas recirculated into the engine is at the predetermined limit.

3. An apparatus for controlling an air-fuel ratio in an internal combustion engine equipped with an intake manifold, comprising:

means for delivering a quantity of fuel to the engine;

means for delivering a quantity of air to the engine;

means for recirculating a quantity of exhaust gas into the intake manifold of the engine when operating in a predetermined engine operating region;

means for sensing the air-fuel ratio in the engine;

means for sensing when the engine is operating in a predetermined high engine operating region;

means for sensing when the engine is operating in a predetermined low engine operating region;

means for sensing when the engine is operating in a predetermined intermediate engine operating region, the predetermined intermediate engine operating region being below the predetermined high engine operating region and being above the predetermined low engine operating region;

means for adjusting the quantity of fuel delivered to the engine in response to the sensed engine air-fuel ratio when operating in the predetermined high engine operating region in direction to maintain the air-fuel ratio at a predetermined air-fuel ratio;

means for adjusting the quantity of fuel delivered to the engine in response to the sensed engine air-fuel ratio when operating in the predetermined low engine operating region in direction to maintain the air-fuel ratio at a predetermined air-fuel ratio; and means for adjusting the quantity of exhaust gas recirculated into the intake manifold of the engine in response to the sensed engine air-fuel ratio when operating in the predetermined intermediate engine operating region in direction to maintain the air-fuel ratio at a predetermined air-fuel ratio.

4. The apparatus of claim 3, further comprising:

means for determining when the quantity of the exhaust gas recirculated into the intake manifold of the engine is at a predetermined limit; and means for adjusting a predetermined one of the quantity of air to be delivered to the engine and the quantity of fuel to be delivered to the engine in response to the sensed air-fuel ratio in direction to maintain the engine air-fuel ratio at the predetermined air-fuel ratio, when the quantity of exhaust gas recirculated into the intake manifold of the engine is at the predetermined limit.

5. A method for controlling an air-fuel ratio in an internal combustion engine equipped with an intake manifold, comprising the steps of:

delivering a quantity of fuel to the engine;

sensing the air-fuel ratio in the engine;

recirculating a quantity of exhaust gas into the intake manifold of the engine when operating in a predetermined engine operating region;

adjusting the quantity of exhaust gas recirculated into the intake manifold of the engine in response to the sensed air-fuel ratio when operating in the predetermined engine operating region in direction to maintain the air-fuel ratio at a predetermined air-fuel ratio; and adjusting the quantity of fuel delivered to the engine in response to the sensed air-fuel ratio when operating in an engine operating region other than the predetermined engine operating region in direction to maintain the air-fuel ratio at the predetermined air-fuel ratio.

6. The method of claim 5, further comprising the steps of:

delivering a quantity of air to the engine;

determining when the quantity of the exhaust gas recirculated into the engine intake manifold is at a predetermined limit; and adjusting a predetermined one of the quantity of air to be delivered to the engine and the quantity of fuel to be delivered to the engine in response to the sensed air-fuel ratio when operating in the predetermined engine operating region, in direction to maintain the air-fuel ratio at a predetermined air-fuel ratio, when the quantity of exhaust gas recirculated into the engine intake manifold is at the predetermined limit.

7. A method of controlling an air-fuel ratio in an internal combustion engine equipped with an intake manifold, comprising the steps of:

delivering a quantity of fuel to the engine;

delivering a quantity of air to the engine;

recirculating a quantity of exhaust gas into the intake manifold of the engine when operating in a predetermined engine operating region;

sensing the air-fuel ratio in the engine;

sensing when the engine is operating in a predetermined high engine operating region;

sensing when the engine is operating in a predetermined low engine operating region;

sensing when the engine is operating in a predetermined intermediate engine operating region, the predetermined intermediate engine operating region being below the predetermined high engine operating region and being above the predetermined low engine operating region;

adjusting the quantity of fuel delivered to the engine in response to the sensed engine air-fuel ratio when operating in the predetermined high engine operating region in direction to maintain the air-fuel ratio at a predetermined air-fuel ratio;

adjusting the quantity of fuel delivered to the engine in response to the sensed engine air-fuel ratio when operating in the predetermined intermediate engine operating region in direction to maintain the air-fuel ratio at a predetermined air-fuel ratio; and adjusting the quantity of exhaust gas recirculated into the intake manifold of the engine in response to the sensed engine air-fuel ratio when operating in the predetermined intermediate engine operating region in direction to maintain the air-fuel ratio at a predetermined air-fuel ratio.

8. The method of claim 7, further comprising the steps of:

determining when the quantity of the exhaust gas recirculated into the intake manifold of the engine is at a predetermined limit; and adjusting a predetermined one of the quantity of air to be delivered to the engine and the quantity of fuel to be delivered to the engine in response to the sensed air-fuel ratio in direction to maintain the engine air-fuel ratio at the predetermined air-fuel ratio, when the quantity of exhaust gas recirculated into the intake manifold of the engine is at the predetermined limit.

* * * * *